(12) United States Patent
Notargiacomo

(10) Patent No.: US 10,454,504 B2
(45) Date of Patent: Oct. 22, 2019

(54) SYSTEM FOR THE DISTRIBUTION OF RADIO FREQUENCY SIGNALS AND RELATIVE COMBINER DEVICE

(71) Applicant: TEKO TELECOM S.R.L., Castel San Pietro Terme (IT)

(72) Inventor: Massimo Notargiacomo, Castel San Pietro Terme (IT)

(73) Assignee: Teko Telecom S.r.l., Castel San Pietro Terme (IT)

(*) Notice: Subject to any disclaimer, the term of this patent is extended or adjusted under 35 U.S.C. 154(b) by 36 days.

(21) Appl. No.: 15/304,819

(22) PCT Filed: Apr. 15, 2015

(86) PCT No.: PCT/IB2015/052735
§ 371 (c)(1),
(2) Date: Oct. 17, 2016

(87) PCT Pub. No.: WO2015/159230
PCT Pub. Date: Oct. 22, 2015

(65) Prior Publication Data
US 2017/0047949 A1    Feb. 16, 2017

(30) Foreign Application Priority Data

Apr. 17, 2014  (IT) .............................. MO2014A0106

(51) Int. Cl.
*H04B 1/00*  (2006.01)
*H04B 1/10*  (2006.01)
*H04B 1/525* (2015.01)

(52) U.S. Cl.
CPC ........... *H04B 1/0053* (2013.01); *H04B 1/109* (2013.01); *H04B 1/525* (2013.01)

(58) Field of Classification Search
None
See application file for complete search history.

(56) References Cited

U.S. PATENT DOCUMENTS

2012/0275350 A1   11/2012  Kwok
2013/0310023 A1*  11/2013  Bevan ................... H04B 1/1027
                                                              455/423

(Continued)

OTHER PUBLICATIONS

Agrawal et al., RFIC Design and Testing for Wireless Communication, 07/18,21,22/2008.*

(Continued)

*Primary Examiner* — Kodzovi Acolatse
*Assistant Examiner* — The Hy Nguyen
(74) *Attorney, Agent, or Firm* — David B. Tingey; Bryant J. Keller; Kirton McConkie

(57) ABSTRACT

The system for the distribution of radio frequency signals, includes a combiner device of radio frequency signals having a plurality of signal connectors, a first antenna connector operatively connected to a first group of signal connectors and a second antenna connector operatively connected to a second group of signal connectors, and two antennas or a dual polarization antenna (A) connected to the antenna connectors, and a distribution device of radio frequency signals connected to the signal connectors. And, depending on the frequency band of the inter-modulation products of third order or higher generated by two downlink signals, one or more signal connectors from the first group or the second group is assigned to the downlink signals.

10 Claims, 3 Drawing Sheets

(56) References Cited

U.S. PATENT DOCUMENTS

2014/0003300 A1   1/2014 Weissman et al.
2016/0268993 A1*  9/2016 Gong ..................... H03H 7/48
2017/0012358 A1*  1/2017 Feng ..................... H04B 7/10

OTHER PUBLICATIONS

Search Report dated Dec. 18, 2014 from Italian Patent Application No. MO2014A000106 filed Apr. 17, 2014.
International Search Report and Written Opinion dated Jul. 15, 2015 from International Patent Application No. PCT/IB2015/052735, filed Apr. 15, 2015.

\* cited by examiner

Fig. 5
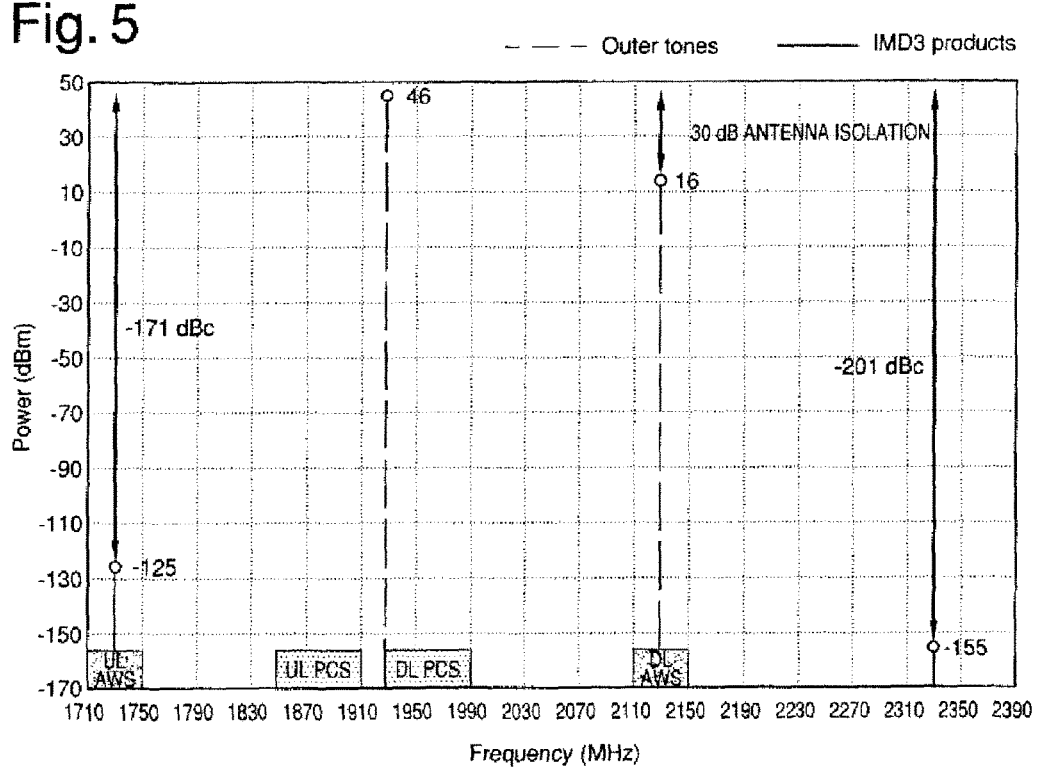
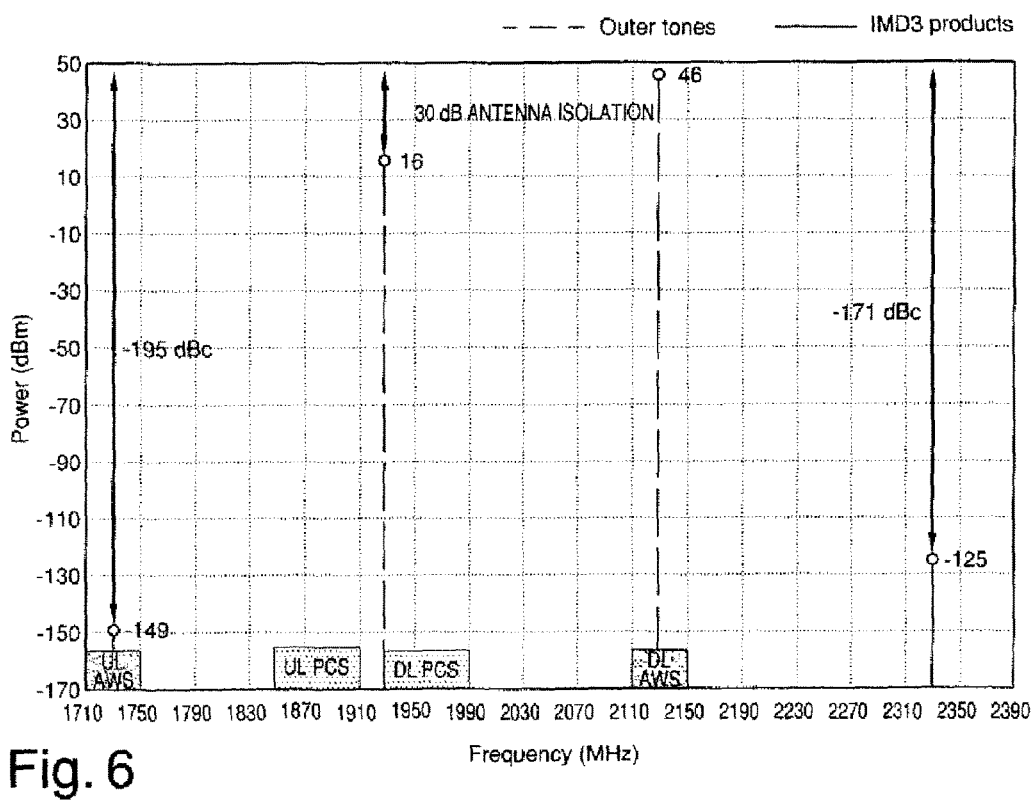
Fig. 6

SYSTEM FOR THE DISTRIBUTION OF RADIO FREQUENCY SIGNALS AND RELATIVE COMBINER DEVICE

CROSS REFERENCE TO RELATED APPLICATION(S)

This application is a U.S. National Stage Entry of International Patent Application No. PCT/IB2015/052735, filed Apr. 15, 2015, which claims the benefit of Italian Patent Application No. MO2014A000106, filed Apr. 17, 2014, the disclosures of which are hereby incorporated entirely herein by reference.

BACKGROUND

Technical Field

The present disclosure relates to a system for the distribution of radio frequency signals and to a respective implementation method.

Background Art

With reference to radio frequency communication systems, it is known that the so-called passive inter-modulation phenomenon (PIM) occurs in case of the presence of two or more signals in a non-linear device.

The causes of the non-linearity of a device can be numerous, from the presence of oxidized connections to the presence of imperfect contacts.

In any case, the effect of the non-linearity is to generate new additional signals with spurious frequencies which are not only the harmonic frequencies (whole multiples) of the input frequencies, but are also the sum and the difference of the original frequencies and of the multiples of such frequencies.

Some of such inter-modulation distortion products (Inter-modulation Distortion or, in short, IMD) can fall within the reception band of the signals and thus cause a desensitization of the system.

In particular, the inter-modulation products of third order (IMD3) tend to fall within the reception band and are generally the highest in terms of power.

It is therefore necessary to reduce passive inter-modulation to the utmost or at least its effects on the reception branch or branches, in such a way as to make the generated spurious frequencies less invasive.

In particular, the problem of inter-modulation distortion is all the more felt in DAS (Distributed Antenna System) communication systems, wherein different radio operators and different frequency bands combined together are present.

SUMMARY

The main aim of the present disclosure is to provide a system for the distribution of radio frequency signals which allows to considerably reduce the disturbances from passive inter-modulation.

Another object of the present disclosure is to provide a system for the distribution of radio frequency signals which allows to overcome the mentioned drawbacks of the prior art within the ambit of a simple, rational, easy and effective to use as well as affordable solution.

The above mentioned objects are achieved by the present system according to the characteristics of claim 1.

The above mentioned objects are also achieved by the present method according to the characteristics of claim 6.

BRIEF DESCRIPTION OF THE DRAWINGS

Other characteristics and advantages of the present disclosure will become better evident from the description of a preferred, but not exclusive embodiment of a system for the distribution of radio frequency signals and of a respective implementation method, illustrated by way of an indicative, but not limitative example in the accompanying drawings wherein:

FIGS. 2 to 6 are graphs which compare possible examples of inter-modulation products of third order in case of use or not of the system according to the disclosure.

EMBODIMENTS

Figure 1:
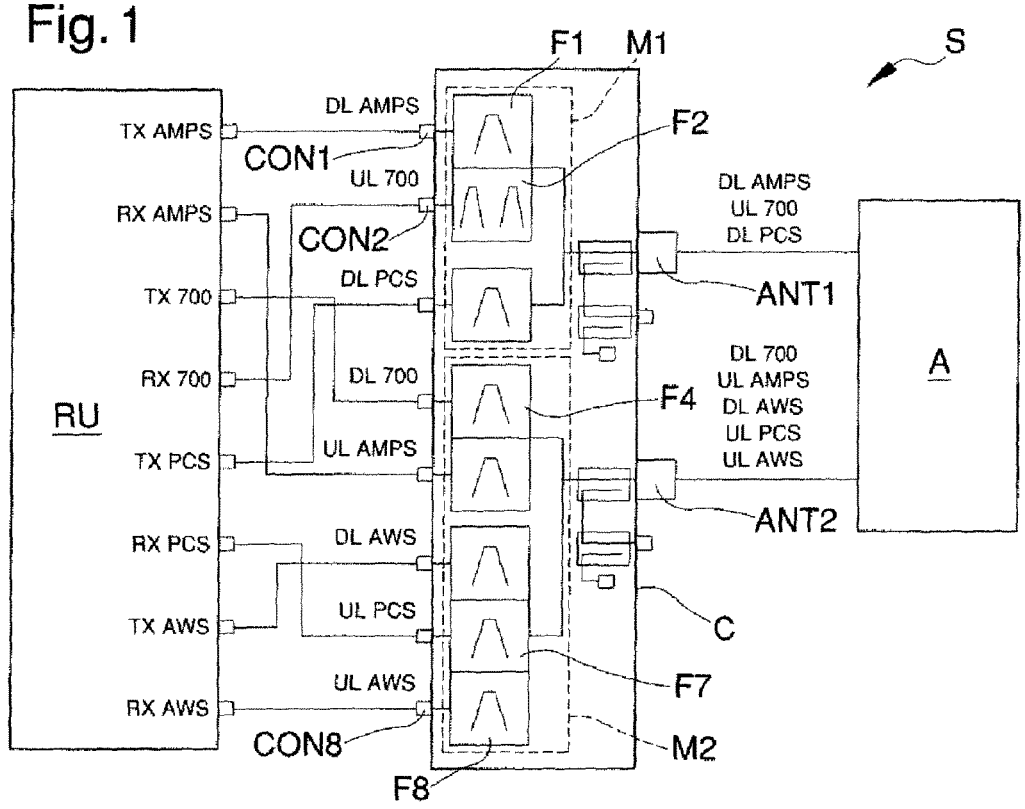
FIG. 1 is a general diagram which shows the system according to the disclosure.

With particular reference to the FIG. 1, S globally indicates a system for the distribution of radio frequency signals, usable for example in DAS (Distributed Antenna System) communication systems.

The system S comprises a combiner device C of radio frequency signals, or "combiner" having a plurality of signal connectors CON1-CON8, a first antenna connector ANT1 operatively connected to a first group CON1-CON3 of signal connectors and a second antenna connector ANT2 operatively connected to at least a second group CON4-CON8 of signal connectors.

In particular, the combiner device C comprises a first combination unit M1 connected to the first group CON1-CON3 of signal connectors, connected to the first antenna connector ANT1 and able to combine together the radio frequency signals coming from such signal connectors of the first group CON1-CON3 and then send them to the first antenna connector ANT1.

Similarly, the combiner device C comprises a second combination unit M2 connected to the second group CON4-CON8 of signal connectors, connected to the second antenna connector ANT2 and able to combine together the radio frequency signals coming from such signal connectors of the second group CON4-CON8 and then send them to the second antenna connector ANT2.

More specifically, the first and the second combination units M1 and M2 can comprise respective bandpass filters F1-F8 (typically in cavity or ceramics) suitably connected to respective signal connectors CON1-CON8.

For example, with reference to the particular embodiment shown in FIG. 1, the signal connector CON2 dedicated to the uplink frequency band 700 requires the use of two filters in parallel, indicated in the illustration with the reference F2, inasmuch as such uplink band consists of two sub-bands (698-715 MHz and 776-787 MHz). Between the two sub-bands is located the respective downlink band 700, to which is assigned a respective dedicated filter F4.

Furthermore, low-pass filters can be present suitably connected between the signal connectors CON1-CON8 and the respective bandpass filters F and able to attenuate any harmonic frequencies.

Finally, the above first and second combination units M1 and M2 can comprise suitable low-pass/high-pass filters or bandpass filters able to adapt and combine together the bandpass filters F to bring them on the respective antenna connectors ANT1 and ANT2.

Different embodiments of the combiner device C cannot however be ruled out comprising a different number of signal connectors and antenna connectors and wherein the signal connectors are operatively connected to the antenna connectors in a different way.

With reference to the particular embodiment shown in the figures, the system S also comprises at least a dual polarization antenna A connected to the antenna connectors ANT1 and ANT2.

Alternative embodiments cannot however be ruled out wherein, for example, the system S comprises a pair of antennas isolated the one from the other and associated with the first antenna connector ANT1 and with the second antenna connector ANT2 respectively.

The system S also comprises a distribution device RU of radio frequency signals connected to the signal connectors CON1-CON8.

In a DAS type system, for example, the distribution device can consist of a multi-band remote unit (Remote Unit—RU), connected to a main unit (Master Unit—MU) by means of an optical fibre connection.

More specifically, the distribution device can consist of a multi-band remote unit or of a single-band remote unit having in any case a plurality of different-signal antenna connectors.

Conveniently, the combiner device C can be external and connected to the distribution device RU, as shown in FIG. 1, or it can be made integral within the distribution device itself.

Advantageously, the transmission and reception branches of the distribution device RU are connected to the signal connectors CON1-CON8 of the combiner device C as described below.

If the inter-modulation products of third order IMD3 or higher order generated by at least two downlink signals belonging to the same frequency band are such as to fall within the respective frequency band of uplink signals or, in any case, in an uplink band used by the DAS system, then a signal connector belonging to the first group CON1-CON3 is assigned to the downlink signals, while a signal connector belonging to the second group CON4-CON8 is assigned to the uplink signals.

In practice therefore, the assignment of the downlink and uplink frequency bands to the signal connectors CON1-CON8, and therefore to the respective antenna connectors ANT1 and ANT2, is done so as to minimize the effects of the inter-modulation products of third order or higher order generated by downlink signals and such as to fall within the same uplink frequency band, or, in any case, in an uplink band used by the DAS system, connecting the transmission branch (downlink) and the reception branch (uplink) to different antenna connectors ANT1 and ANT2.

Furthermore, if the inter-modulation products of third order IMD3 generated by at least two downlink signals belonging to different frequency bands are such as to fall within at least an uplink frequency band, then two signal connectors belonging, respectively, to the first group CON1-CON3 and to the second group CON4-CON8 are assigned to the downlink signals.

Advantageously, in such case a signal connector, selected from among the group of signal connectors CON1-CON8 connected to the antenna connector ANT1 or ANT2 with inter-modulation product of lower third order IMD3, is assigned to the uplink signals.

In practice, therefore, the system S according to the disclosure permits assigning frequency bands to the combiner device C so as to minimize the disturbances from passive inter-modulation.

The assignment of the frequency bands to the signal connectors CON1-CON8 and, consequently, to the respective antenna connectors ANT1 and ANT2 is done taking into account the effects of the inter-modulation products of third order or higher order generated by two tones $x_1(t)=A_1 \cos(2\pi f_1 t)$ and $x_2(t)=A_2 \cos(2\pi f_2 t)$.

In particular, the inter-modulation product of third order IMD3 can be calculated using the following formula:

$$IMD3 = A_{3,1} \cos[2\pi(|2f_1 \pm f_2|)t] + A_{3,2} \cos[2\pi(|2f_2 \pm f_1|)t]$$

where
  $x_1(t)=A_1 \cos(2\pi f_1 t)$ is a first tone;
  $x_2(t)=A_2 \cos(2\pi f_2 t)$ is a second tone;
  $A_{3,1} = a_3 A_1^2 A_2$
  $A_{3,2} = a_3 A_2^2 A_2$
  $a_3$ is the coefficient that indicates the weight of the disturbance of third order;
  $f_1$ is a first frequency;
  $f_2$ is a second frequency.

In practice, the assignment of the frequency bands is done so as to minimize the inter-modulation products of third order or higher generated by downlink signals belonging to different frequency bands and such as to fall within the frequency band of an uplink signal.

In both cases, therefore, by assigning the downlink signals in a calculated way to each of the two antenna connectors ANT1 and ANT2, it is possible to take advantage of the isolation present between the two antennas or in the dual polarization antenna A. In fact, the isolation of the antenna A permits obtaining a significant reduction in the amplitude of the inter-modulation products of third order or of higher order, with consequent better quality signal.

Advantageously, the two scenarios described above can coexist in a single combiner device C, according to the frequency bands involved.

Consequently, the phases for an optimum assignment of the signal connectors CON1-CON8 and of the antenna connectors ANT1 and ANT2 of the combiner device C can be summed up as follows:
  to assign to different antenna connectors ANT1 and ANT2 the uplink frequency band interfered by the corresponding interfering downlink band;
  to assign to different antenna connectors ANT1 and ANT2 the interfering downlink frequency bands, the combination of signals of which generates inter-modulation product of third order or of higher order falling at least within an uplink frequency band;
  to assign the uplink frequency band (or frequency bands) interfered by the combination of signals belonging to different downlink frequency bands to the antenna connector ANT1 and ANT2 of the combiner device C corresponding to lower IMD3 products.

By way of example, the case is taken into account wherein two different tones $x_1(t)=A_1 \cos(2\pi f_1 t)$ and $x_2(t)=A_2 \cos(2\pi f_2 t)$ are present on the same downlink band, where:
  $f_1 = 1930$ MHz belongs to the downlink frequency band PCS;
  $f_2 = 1970$ MHz belongs to the downlink frequency band PCS;
  $A_1 = A_2 = \sqrt{P}$ with P=43 dBm (20 W);
  with a coefficient $a_3$ so that the PIM on each connector=− 147 dBc with 2×43 dBm;
  isolation between connectors (considering a dual polarization antenna A)=30 dB.

Figure 2:
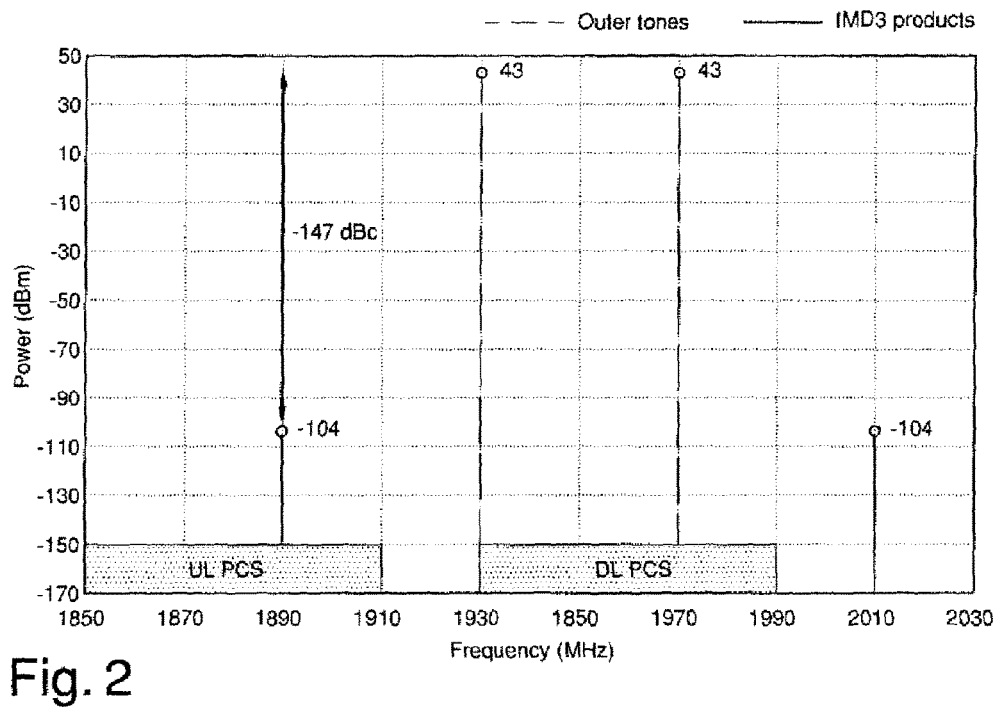

If the downlink band PCS and the uplink band PCS are associated with the same antenna connector ANT1 or ANT2, the inter-modulation products of third order IMD3 can be calculated as shown in FIG. 2, considering a weight coefficient of the disturbance of third order $a_3$ as defined above.

Therefore, by bringing the signals f1 and f2 e.g. on the same antenna connector ANT1 the inter-modulation is created shown in FIG. 2, wherein the inter-modulation product falls within the reception band.

As shown in FIG. 2, the inter-modulation product is high (the disturbing signal is received at −104 dBm) and falls within the uplink frequency band PCS (at 1890 MHz).

In particular, it is pointed out that in FIG. 2 the shown term IMD is obtained considering the worst scenario, as the sum of the term IMD3 generated at the second antenna connector ANT2 added to the term IMD3 generated at the first antenna connector ANT1 and attenuated by means of the isolation coefficient of the antenna A.

Figure 3:
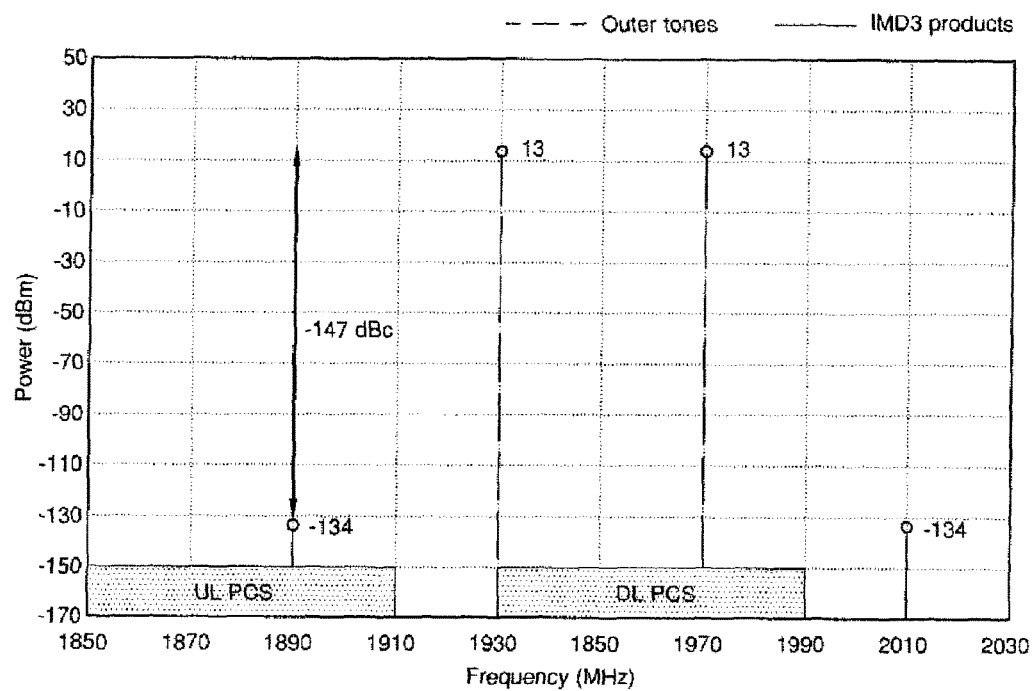

Otherwise, as shown in FIG. 3, with reference to the system S, the downlink frequency band PCS is assigned to the first antenna connector ANT1 and the uplink frequency band PCS is assigned to the second antenna connector ANT2. In this case, therefore, the isolation of the antenna A can be exploited to obtain an effect of the product IMD reduced in the uplink band PCS.

Consequently, according to such solution, the downlink band PCS and the uplink band PCS are assigned to two different antenna connectors ANT1 and ANT2 of the combiner device C.

More specifically, by connecting the receiver on the antenna connector ANT2, the signal is attenuated by the isolation value between the two antennas (or between the two branches of the dual polarization antenna). In particular, imagining an isolation of 30 dB, the signal is attenuated by −134 dBm, thus proving harmless.

A signal transmitted from a mobile terminal will more or less reach the same level both on the antenna connector ANT1 and on the antenna connector ANT2 (excepting fading phenomena in any case below 30 dB and generally around 10-15 dB) and it is therefore clear that the Carrier/PIM ratio is maximized.

Furthermore, also arriving on the connector ANT2 are the two signals at frequencies f1 and f2, but 30 dB lower, therefore at 13 dBm each, and the inter-modulations generated on the antenna connector ANT2 with these levels are therefore negligible.

Conveniently, it is also pointed out that the downlink signals are thus distributed on both the antenna connectors ANT1 and ANT2, with consequent more balanced power distribution.

Advantageously, the system S also permits minimizing the inter-modulation products generated by two or more tones (or modulated signals) belonging to different frequency bands.

Figure 4:
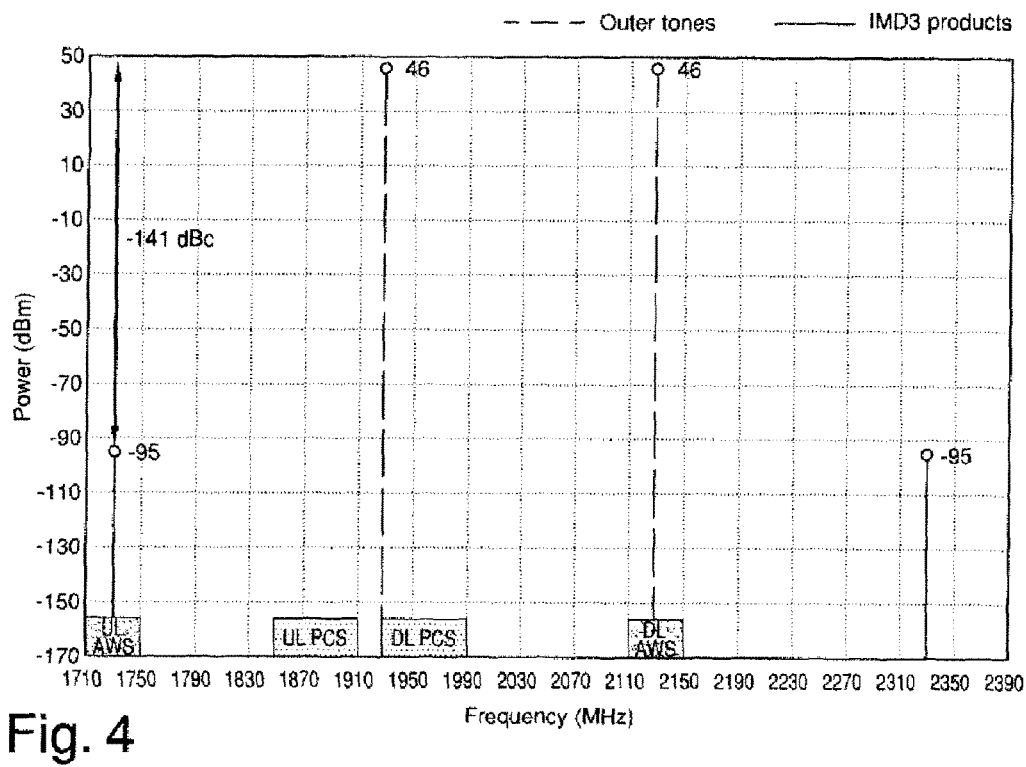

An example of such application is described below and is illustrated in FIGS. 4, 5 and 6.

Given two tones $x_1(t)=A_1 \cos(2\pi f_1 t)$ and $x_2(t)=A_2 \cos(2\pi f_2 t)$ wherein:
- $f_1$=1930 MHz belongs to the downlink frequency band PCS;
- $f_2$=2130 MHz belongs to the downlink frequency band AWS;
- $A_1=A_2=\sqrt{P}$ with P=46 dBm (40 W);
- with a coefficient $a_3$ so that the PIM on each connector=−141 dBc with 2×46 dBm;
- isolation between connectors (considering a dual polarization antenna)=30 dB.

In the event of both the tones being assigned to a same antenna connector ANT1 or ANT2 of the combiner device C, then the generated term IMD3 is the same as that shown in FIG. 4, calculated considering a weight coefficient of the disturbance of third order $a_3$ as defined above.

As shown, the inter-modulation product is high and falls within the uplink frequency band AWS (at 1730 MHz).

More specifically, in this case, two transmitters are present, each 46 dBm operating on different bands. On the antenna connector ANT1 are 2×46 dBm and one IMD3 of −95 dBm, while on the antenna connector ANT2 are −125 dBm.

Advantageously, with reference to the system S, the downlink frequency band PCS and the downlink frequency band AWS are associated with two distinct antenna connectors ANT1 and ANT2 of the combiner device C. Such solution permits taking advantage of the isolation of the antenna A so as to significantly reduce the amplitude of the product IMD falling within the uplink frequency band AWS.

If the downlink signals PCS are addressed to the first antenna connector ANT1 and the downlink signals AWS are addressed to the second antenna connector ANT2, then the term IMD3 calculated at the first connector ANT1 is the same as that shown in FIG. 5 and the term IMD3 calculated at the second connector ANT2 is the same as that shown in FIG. 6.

Consequently, by sending a signal (at the frequency f1) on the antenna connector ANT1 and a signal (at the frequency f2) on the antenna connector ANT2 then, as shown in FIG. 5, on the first antenna connector ANT1 are present 46 dBm at f1 and 46−30=16 dBm of signal at f2 by means of antenna isolation. The same situation occurs on the second antenna connector ANT2, but with levels at f1 and f2 changed over, as shown in FIG. 6.

In particular, from the calculation formula of the IMD3 shown above it can occur that in this case one of the IMD3 is reduced by 30 dB (the one with the term not squared) and the other is reduced by 60 dB (the one tied to the squared term). Always from the formula relating to the calculation of the IMD3 it can be ascertained that the most significant reduction concerns the IMD3 in the proximity of the attenuated signal (as can be determined in FIG. 5 with reference to the first antenna connector ANT1 and in FIG. 6 with reference to the second antenna connector ANT2). With reference to the specific example shown in the illustrations, therefore, the receiver AWS is assigned to the second antenna connector ANT2, such connector being in fact that in which the IMD3 could be more significant.

It must also be pointed out that, as can be ascertained in the FIGS. 5 and 6, the contribution must also be considered of the IMD3 generated on the first antenna connector ANT1 and which falls on the second antenna connector ANT2 by effect of the isolation (30 dB).

Consequently, on the second antenna connector ANT2 are present −95 dBm (generated with 2×46 dBm) and −60 dB (due to the choice of the connector), for a total of −155 dBm, to which must be added the contribution of the first antenna connector ANT1, equal to −95 dBm, −30 dB and −30 dB, for a total of −155 dBm.

Thanks to the difference in power between the two tones due to the coefficient of isolation of the antenna A, the inter-modulation product is considerably reduced.

It is further pointed out that in FIG. 6 the term IMD3 shown is obtained considering the worst scenario as the sum of the term generated by the second antenna connector and of the term calculated at the first antenna connector attenuated by the coefficient of separation of the antenna.

With reference to the specific example shown, the comparison between the FIGS. 5 and 6 shows how it is best to assign the downlink signals AWS and PCS to different antenna connectors ANT1 and ANT2 and how, furthermore, it is best to assign the uplink signal AWS to the same antenna connector ANT1 or ANT2 to which is assigned the downlink signal AWS, considering that on such antenna connector the term IMD3 is considerably lower.

The method for the realization of the system S for the distribution of radio frequency signals is described below.

The method comprises the followings steps:

providing the combiner device C of radio frequency signals having signal connectors CON1-CON8, the first antenna connector ANT1 operatively connected to the first group CON1-CON3 of the signal connectors CON1-CON3 and the second antenna connector ANT2 operatively connected to the second group CON4-CON8 of the signal connectors CON4-CON8;

connecting the antenna connectors ANT1 and ANT2 to respective antennas or to the dual polarization antenna A.

The method also envisages the step of connecting the signal connectors CON1-CON8 to the distribution device RU of radio frequency signals in accordance with what is described below.

If the inter-modulation products of third order IMD3 or higher order generated by at least two downlink signals belonging to the same frequency band are such as to fall within at least a frequency band of uplink signals, then a signal connector belonging to the first group CON1-CON3 is assigned to the downlink signals, while a signal connector belonging to the second group CON4-CON8 is assigned to the uplink signals.

In practice, therefore, the assignment of the downlink and uplink frequency bands to the connectors is done so as to minimize the effects of the inter-modulation products of third order or higher order generated by downlink signals and such as to fall within the same uplink frequency band or, in any case, within an uplink band used by the DAS system, connecting the transmission branch (downlink) and the reception branch (uplink) to different antennas ANT1 and ANT2.

If the inter-modulation products of third order IMD3 generated by at least two downlink signals belonging to different frequency bands are such as to fall within at least one of the respective uplink frequency bands, then at least two signal connectors belonging to the first group CON1-CON3 and to the second group CON4-CON8 are assigned to the downlink signals, respectively.

Furthermore, in such case a signal connector CON1-CON8 selected from among the CON1-CON3 or the CON4-CON8 group connected to the antenna connector ANT1 or ANT2 with inter-modulation product of the lower third order IMD3, is assigned to said uplink signals.

It has in practice been ascertained how the described disclosure achieves the intended objects.

In particular, the fact is underlined that the system for the distribution of the radio frequency signals according to the disclosure permits considerably reducing the disturbances from passive inter-modulation or in any case their negative effects on the reception branch or branches.

Another advantage, furthermore, is represented by the fact that the system according to the disclosure does not carry all the downlink signals on a single antenna connector, as in the state of the art, but instead envisages the distribution of downlink signals on both antenna connectors, with a consequent more balanced power distribution.

The invention claimed is:

1. A system for the distribution of radio frequency signals, comprising at least a combiner device of radio frequency signals having a plurality of signal connectors, at least a first antenna connector operatively connected at least to a first group of said signal connectors and at least a second antenna connector operatively connected to at least a second group of said signal connectors, at least two antennas or at least a dual polarization antenna connected to said antenna connectors, at least a distribution device of radio frequency signals connected to said signal connectors, wherein transmission and reception branches of said distribution device are connected to said signal connectors of the combiner device, wherein:

if the inter-modulation products of third order or higher order generated by at least two downlink signals belonging to a same frequency band are such as to fail within at least a frequency band of uplink signals, then at least a signal connector belonging to said first group is assigned to said downlink signals, while at least a signal connector belonging to said second group is assigned to said uplink signals; and if the inter-modulation products of third order or higher order generated by at least two downlink signals belonging to different frequency bands are such as to fall within at least an uplink frequency band, then at least two signal connectors belonging, respectively, to said first group and to said second group are assigned to said downlink signals; wherein based on effects of the inter-modulation products of third order or higher order the assignment of the downlink signals to each of the first antenna connector and second antenna connector creates an isolation between the two antennas or in the dual polarization antenna.

2. The system according to claim 1, wherein if the inter-modulation products of third order or higher order generated by at least two downlink signals belonging to different frequency bands are such as to fall within at least a frequency band of uplink signals, then at least a signal connector, selected from the group of said signal connectors operatively connected to the antenna connector with inter-modulation product of the lower third order, is assigned to said uplink signals.

3. The system according to claim 1, wherein said inter-modulation products of third order are calculated using the following formula:

$$IMD3 = A_{3,1} \cos\left[2\pi(|2f_1 \pm f_2|)t\right] + A_{3,2} \cos\left[2\pi(|2f_2 \pm f_1|)t\right] \text{ where}$$

$x_1(t) = A_1 \cos(2\pi f_1 t)$ is a first tone;
$x_2(t) = A_2 \cos(2\pi f_2 t)$ is a second tone;
$A_{3,1} = a_3 A_1^2 A_2$
$A_{3,2} = a_3 A_2^2 A_1$
$a_3$ is the coefficient that indicates the weight of the disturbance of third order;
$f_1$ is a first frequency; and
$f_2$ is a second frequency.

4. The system according to claim 1, wherein said combiner device comprises:

at least a first combination unit comprising a first filter connected to said first group of signal connectors, connected to said first antenna connector and configured to combine together the radio frequency signals coming from said signal connectors of the first group and then send them to said first antenna connector; and at least a second combination unit comprising a second filter connected to said second group of input connectors, connected to said second antenna connector and configured to combine together the radio frequency signals coming from said signal connectors of the second group and then send them to said second antenna connector.

5. The system according to claim 1, wherein said combiner device is made integral within said distribution device.

6. A combiner device of the radio frequency signals having a plurality of signal connectors, at least a first antenna connector operatively connected to at least a first group of said signal connectors and at least a second antenna connector operatively connected to at least a second group of said signal connectors, wherein:
   if the inter-modulation products of third order generated by at least two downlink signals belonging to a same frequency band are such as to fall within at least a frequency band of uplink signals, then at least a signal connector belonging to said first, group is assigned to said downlink signals, while at least a signal connector belonging to said second group is assigned to said uplink signals; and
   if the inter-modulation products of third order generated by at least two downlink signals belonging to different frequency bands are such as to fall within at least an uplink frequency band, then at least two signal connectors belonging to said first group and to said second group are assigned, respectively, to said downlink signals; wherein based on effects of the inter-modulation products of third order or higher order the assignment of the downlink signals to each of the first antenna connector and second antenna connector creates an isolation between two antennas or in a dual polarization antenna.

7. The combiner device according to claim 6, wherein if the inter-modulation products of third order generated by at least two downlink signals belonging to different frequency bands are such as to fall within at least a frequency band of uplink signals, then at least a signal connector, selected from the group of said signal connectors operatively connected to the antenna connector with inter-modulation product of the lower third order, is assigned to said uplink signals.

8. A method for the realization of a system of distribution of radio frequency signals, comprising the following steps:
   providing at least a combiner device of radio frequency signals having a plurality of signal connectors, at least a first antenna connector operatively connected to at least a first group of said signal connectors and at least a second antenna connector operatively connected to at least a second group of said signal connectors; comprising the following steps:
   in response to the inter-modulation products of third order generated by at least two downlink signals belonging to a same frequency band are such as to fall within at least a frequency band of uplink signals, then at least a signal connector belonging to said first group is assigned to said downlink signals, while at least a signal connector belonging to said second group is assigned to said uplink signals; and
   in response to the inter-modulation products of third order generated by at least two downlink, signals belonging to different frequency bands are such as to fall within at least an uplink frequency band, then at least two signal connectors belonging, respectively, to said first group and to said second group are assigned to said downlink signals; wherein based on effects of the inter-modulation products of third order or higher order the assignment of the downlink signals to each of the first antenna connector and second antenna connector creates an isolation between two antennas or in a dual polarization antenna.

9. The method according to claim 8, wherein if the inter-modulation products of third order generated by at least two downlink signals belonging to different frequency bands are such as to fall within at least a frequency band of uplink signals, then at least a signal connector, selected from the group of said signal connectors operatively connected to the antenna connector with inter-modulation product of the lower third order, is assigned to said uplink signals.

10. The method according to claim 8, wherein said inter-modulation products of third order are calculated using the following formula:

$$IMD3 = A_{3,1} \cos[2\pi(|2f_1 \pm f_2|)t] + A_{3,2} \cos[2\pi(|2f_2 \pm f_1|)t]$$

where
$x_1(t) = A_1 \cos(2\pi f_1 t)$ is a first tone;
$x_2(t) = A_2 \cos(2\pi f_2 t)$ is a second tone;
$A_{3,1} = a_3 A_1^2 A_2$
$A_{3,2} = a_3 A_2^2 A_1$
$a_3$ is the coefficient that indicates the weight of the disturbance of third order;
$f_1$ is a first frequency; and
$f_2$ is a second frequency.

* * * * *